(No Model.) 2 Sheets—Sheet 1.

G. WALTER.
MIDDLINGS PURIFIER.

No. 442,212. Patented Dec. 9, 1890.

Witnesses:
J. Jessen
C. G. Hawley

Inventor
George Walter
By Paul & Merwin
Attorneys (No Model.) 2 Sheets—Sheet 2.
G. WALTER.
MIDDLINGS PURIFIER.
No. 442,212. Patented Dec. 9, 1890.
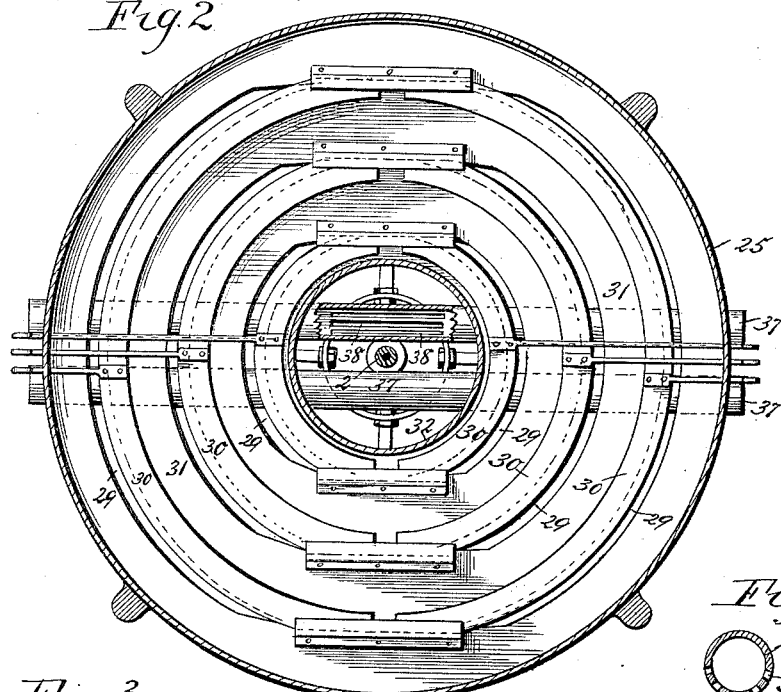
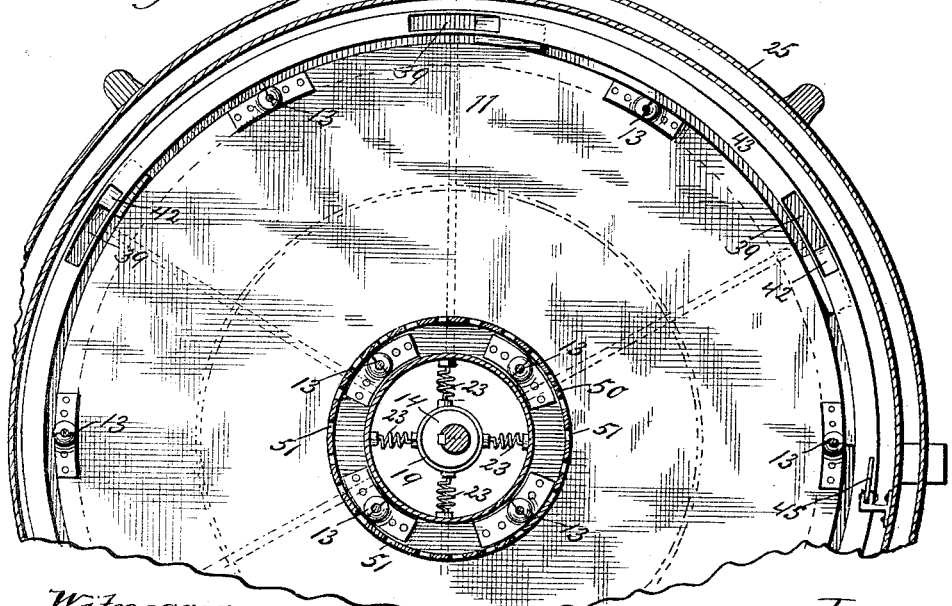
Witnesses:
J. Jessen
C. L. Hawley
Inventor.
George Walter
By Paul & Merwin Attys.

United States Patent Office.

GEORGE WALTER, OF GRAND FORKS, NORTH DAKOTA.

MIDDLINGS-PURIFIER.

SPECIFICATION forming part of Letters Patent No. 442,212, dated December 9, 1890.

Application filed June 9, 1890. Serial No. 354,781. (No model.)

*To all whom it may concern:*

Be it known that I, GEORGE WALTER, of Grand Forks, in the county of Grand Forks and State of North Dakota, have invented certain Improvements in Middlings-Purifiers, of which the following is a specification.

My invention relates to middlings-purifiers of the class in which a suction-draft of air is used in connection with suitable screens for separating the lighter and foreign portions of the stock from the middlings.

The object of my invention is to provide a machine for purifying middlings which will thoroughly and completely separate the valuable middlings from the lighter and foreign portion, and which will do the work required within a much shorter space of time and occupy much less room than machines heretofore devised.

My invention consists in one or more circular sieves loosely mounted upon suitable cams or eccentrics secured upon a driven shaft, in combination with suitable inclosing walls and with means for creating, directing, and regulating a strong current of air passing upwardly through the machine; and, further, my invention consists in the construction and combination hereinafter described, and particularly pointed out in the claims.

My invention will be more readily understood by reference to the accompanying drawings, in which—

Figure 1:
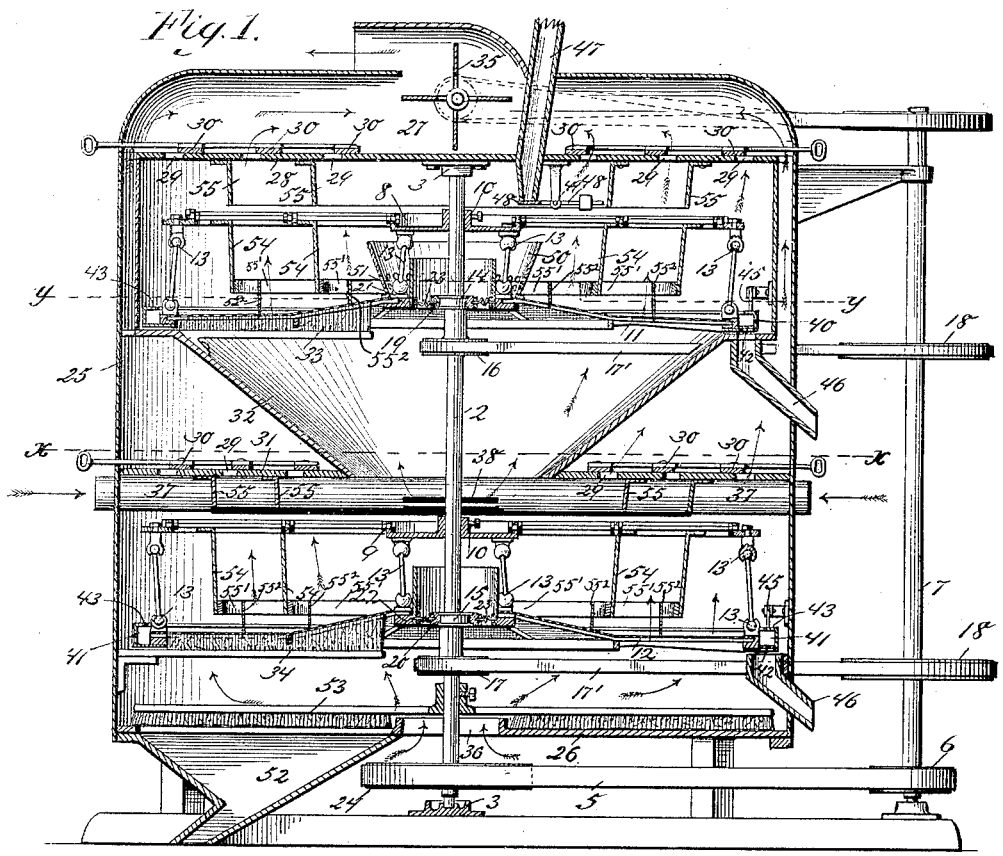
Figure 4:
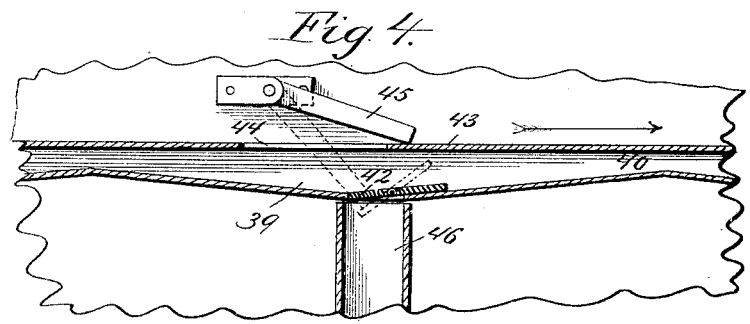

Figure 1 is a vertical sectional elevation of a middlings-purifier embodying my invention. Fig. 2 is a sectional plan view taken from the plane of the line $x\,x$ of Fig. 1. Fig. 3 is a section on line $y\,y$ of Fig. 1, somewhat enlarged. Fig. 4 is a detail view of one of the discharging pockets and valves situated upon the circumference of the sieve. Fig. 5 is a section of one of the air-inlet pipes between the upper and lower sieves.

As shown in Fig. 1, the drive-shaft 2 is secured in the frame of the machine by the journals 3, and is driven by a belt 5 from the pulley 6 upon the counter-shaft 7. The hanger-frames 8 and 9 are secured upon the shaft 2 by the collars and set-screws 10, and are adapted to support, respectively, the circular screens 11 and 12 through the medium of the ball-and-socket links 13, as shown. The cams 14 and 15 are loose upon the shaft 2, and are attached to and revolved quite rapidly with the loose pulleys 16 and 17 upon the shaft 2, which pulleys are driven by the belts 17', carried over the large pulleys 18, fixed to the counter-shaft 7. As shown, the straps 19 and 20 of the cams 14 and 15 are movably linked with the inner circular frames 21 and 22 of the different sieves by the coiled springs 23. Hence as the shaft 2 is driven by the belt running over the small pulley 6 to the large pulley 24 upon said shaft, while the cams are driven by belts from the large pulleys 18, the cams will revolve at a speed considerably greater than the speed at which the shaft 2 will revolve, and the circular sieve will be given a series of lateral throws during each revolution of the main shaft 2, to which they are attached.

I preferably inclose the sieves in cylindrical walls 25, provided with a suitable bottom or floor 26 and with the fan-chamber 27, separated from the upper sieve by the valve-partition 28, provided with the openings 29 and the semicircular valves 30, which may be operated either in sets or separately to close the openings 29. A similar valve-partition 31 is provided between the upper and lower sieve and at the base of the conical hopper or guide 32 adapted to receive the stock as it falls through the upper sieve 11.

Suitable cleaning-brushes 33 and 34 are attached to the frame of the machine, as shown, and adapted to brush against the under surface of the sieves as they are revolved. The suction-fan 35 in the chamber 27 is driven by a belt from the pulley upon the counter-shaft 7, and is adapted to create a current of air drawn upwardly through the machine from the openings 36 in the floor 26 and through the inlet-pipe 37 and openings 38 therein.

Collecting and discharging pockets 39 are provided in the circular troughs 40 and 41 upon the circumference of the several sieves. As the sieve is revolved and shaken rapidly to and fro the coarser portion of the stock coming upon the screen rolls down into these pockets and collects in the bottom thereof over the valve 42 therein. The tops 43 of these troughs 40 are provided with the openings 44 at regular distances therein, through which the gravity-bars 45, pivotally secured to the outer wall of the machine, are adapted to drop each time one of these holes, which are directly over the several valves 42, come in contact with said bars, thereby opening for an instant the valve 42 to allow the material collected in the pocket 39 to drop into the discharge-spout 46, as shown.

The operation of my middlings-purifier as illustrated in the accompanying drawings is as follows: The stock is fed into the machine through the spout 47 and is adapted to be regulated in its flow through the mouth thereof by the weighted valve 48, pivoted upon a depending arm 49. As the stock is fed through this spout it falls into the small hopper 50 and is distributed therefrom upon the screen or sieve through the perforations 51 in the outer side of the hopper 50. As the stock comes upon the slanting portion of the sieve it quickly rolls down and is thrown out centrifugally upon the same and spread evenly over the whole horizontal surface of the silk cloth forming the sieve. Now, as the sieve is also oscillated the stock on the sieve is constantly turned and thrown up, thus allowing the current of air to flow continuously through the same to carry off the lighter portions and preventing the stock from being piled upon the sieve, and thus cutting off the draft, as in old forms of purifiers. The coarser and lighter portions of the stock are collected and carried off by the collecting-pockets 39 and by the air-current, while the valuable middlings fall through the sieve into the hopper 32. From the hopper 32 the stock falls upon the lower revolving cam-sieve 12, which may be made of a somewhat finer mesh. The stock will fall evenly upon the inner part of the sieve 12 from the lower edge of the hopper 32. Hence it is unnecessary to provide the small hopper 50 upon this lower sieve. As the stock falls upon this sieve 12 it is again spread out and shaken up to allow the air to pass through it, the lighter portions being carried out through the exhaust by the air-current and the heavier and valuable middlings portion, by this time thoroughly cleansed, sifts through the sieve into the chamber below and upon the floor 26 of the machine, there to be swept into the hopper-spout 52 by the revolving brushes 53 attached to the shaft, as shown.

I preferably provide circular cylindrical partitions 54 and 55, as shown, above each of the sieves, to the end that the currents of air may be more evenly distributed and directed through the different parts of the machine. For the sake of clearness these partitions are shown as having some considerable thickness; but in reality I make them of a piece of suitable cloth held in position by rings or hoops 55', which are in turn secured by cords 55² to the hanger-frames 8 and 9 and to the sieves 11 and 12. In case the cams, &c., need oiling these rings or hoops 55', with the cloths, may be easily loosened and lifted out of the way.

Several openings or doors may be provided in the outer walls of the machine in the usual way, through which access may be had to the interior of the machine.

The light material as it is exhausted from above the sieve and carried through the openings 29 in the upper partition 28 and the openings in the corresponding partition 31 into the fan-chamber is delivered into a suitable exhaust-spout, and from thence is carried either to waste, or, if necessary to a secondary purifier.

One great advantage of my machine consists in the use of the circular sieve, whereby a much greater surface is utilized than in the old form of purifiers occupying an equal floor-space and whereby the amount of work done in a given time and space is greatly increased. It is obvious that one, two, or any number of these sieves might be employed in connection with corresponding hoppers and valve-partitions, the sieves being placed one above the other.

Having thus described my invention, I claim as new and desire to secure by Letters Patent—

1. The combination of an upright shaft, means for rotating said shaft, a sieve supported upon said shaft, a cam upon said shaft, means for rotating said cam independently of said shaft, and means connecting said cam with said sieve, whereby said sieve will be given both a rotary and a lateral movement when said shaft and said cam are rotated, substantially as described.

2. The combination of an upright shaft, means for rotating said shaft, a sieve supported upon said shaft, with a driven cam upon said shaft adapted to rotate independently of said shaft and suitably connected with said sieve, whereby said sieve will be given both a rotary and a lateral movement when said shaft and said cam are rotated, a suitable inclosing-chamber for said sieve, and means for creating and maintaining a current of air through said sieve, whereby the lighter portions of the stock as it is passed over the screen are carried out of the said chamber through suitable openings, substantially as and for the purpose set forth.

3. The combination, in a middlings purifier, of an upright shaft adapted to rotate in suitable bearings, suitable frames fixed upon said shaft, sieves hung loosely from said frames and independent of each other, means for rotating said shaft and therewith said frames and sieves, cams adapted to rotate independently upon said shaft, said cams being yieldingly connected with their respective sieves, and means for rotating said cams, whereby said sieves are moved laterally in respect to said shaft.

4. The combination, in a middlings-purifier, of an upright shaft adapted to rotate in suitable bearings, suitable frames fixed upon said shaft, sieves hung loosely from said frames and independent of each other, means for rotating said shaft and therewith said frames and sieves, cams adapted to rotate independently upon said shaft, said cams being yieldingly connected with their respective sieves, means for rotating said cams, whereby said sieves are moved laterally in respect to said shaft, suitable receiving-chambers beneath each of the several sieves, each of said chambers communicating with the chamber of the sieve next below it, and means for creating, maintaining, and directing a flow of air through said sieves and said chambers, substantially as and for the purpose set forth.

5. The combination, in a middlings-purifier, of an upright shaft adapted to rotate in suitable bearings, suitable frames fixed upon said shaft, circular sieves hung loosely from said frames and independent of each other, means for rotating said shaft and therewith said frames and sieves, cams adapted to rotate independently upon said shaft, said cams being yieldingly connected with their respective sieves, means for rotating said cams, whereby said sieves are moved laterally in respect to said shaft, suitable receiving-chambers beneath each of the several sieves, each of said chambers communicating with the chamber of the sieve next below it, said sieves being provided with suitable receiving-troughs and discharge-pockets, valves in said pockets, means for operating said valves, and suitable hopper-spouts adapted to receive the contents of said pockets when said valves are opened, a feed-spout through which the stock is supplied to the upper sieve, means for regulating the discharge of the stock therefrom, suitable cleaning-brushes adapted to clean said sieves as they are revolved, a suitable hopper-spout in the floor of the lowest chamber, and suitable revolving brushes for sweeping the stock into the same as it falls through the lowest sieve, and means for creating, maintaining, and directing and regulating a current of air flowing upwardly through said chambers and sieves, substantially as described.

6. The combination of the pocket 39 upon the circumference of the sieve with the top 43, openings 44, and the valve 42 and the gravity-bar 45, adapted to drop through said opening 44 as the pocket is carried from under said bar to trip said valve, substantially as and for the purpose set forth.

7. The combination of the revolving sieves adapted to be moved laterally by suitable cams and provided with the slanting portion near the center and the level portion, as shown, with the driven shaft and the inclosing-chamber, substantially as described.

8. The combination, with the hoppers and containing-chambers, of the driven shaft, the sieves 11 and 12 suspended thereon and provided with the central inclined portion and with the level portion outside thereof, and the cams 14 and 15 upon said shaft adapted to impart a lateral motion to said sieves, substantially as described.

9. In a middlings-purifier, the combination, with the circular sieve adapted to revolve about a suitable shaft and with the circular inclosing-walls about said sieve, of the partition 28, provided with the outlet-openings 29, said openings being of a substantially semicircular form, the semicircular valve-plates 30, adapted to close over said openings and adapted to be moved laterally to regulate the size of the outlet-openings 29, whereby the upwardly-flowing current of air is exhausted evenly from all parts of the machine, substantially as described.

10. The combination of the circular sieve adapted to be carried by and rotated about the upright shaft with the inclosing-walls, the air-inlet pipes 37, provided with the centrally-placed openings 38 in the under side thereof, the opening 36 in the bottom of the machine, the partitions provided with the semicircular openings 29, adapted to be closed by the sliding semicircular valve-plates 30, adapted to be moved laterally to regulate the size of the outlet-openings 29, the circular partitions 54 and 55, adapted to direct the flow of air, and the exhaust-fan adapted to create an upwardly-flowing current of air through the machine, substantially as described.

In testimony whereof I have hereunto set my hand this 5th day of June, 1890.

GEORGE WALTER.

In presence of—
THOMAS ARNESON,
H. H. GELLERMAN.